United States Patent
Moriguchi et al.

(10) Patent No.: US 11,994,619 B2
(45) Date of Patent: May 28, 2024

(54) LIGHT IRRADIATION APPARATUS AND LASER RADAR APPARATUS

(71) Applicant: DENSO CORPORATION, Kariya (JP)

(72) Inventors: Chihiro Moriguchi, Kariya (JP); Shunpei Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 861 days.

(21) Appl. No.: 17/077,761

(22) Filed: Oct. 22, 2020

(65) Prior Publication Data
US 2021/0041535 A1 Feb. 11, 2021

Related U.S. Application Data

(63) Continuation of application No. PCT/JP2019/016157, filed on Apr. 15, 2019.

(30) Foreign Application Priority Data

Apr. 24, 2018 (JP) .................. 2018-083075

(51) Int. Cl.
G01C 3/08 (2006.01)
G01S 7/481 (2006.01)
G01S 7/499 (2006.01)

(52) U.S. Cl.
CPC .......... *G01S 7/4814* (2013.01); *G01S 7/4815* (2013.01); *G01S 7/499* (2013.01); *G01S 7/4817* (2013.01)

(58) Field of Classification Search
None
See application file for complete search history.

(56) References Cited

U.S. PATENT DOCUMENTS

| 4,955,693 A * | 9/1990 | Bobba ............... G06K 7/10594 |
| | | 235/462.35 |
| 2011/0128525 A1* | 6/2011 | Mizuno ................. G01S 17/931 |
| | | 359/212.2 |
| 2012/0057238 A1* | 3/2012 | Byren ................. G02B 27/0025 |
| | | 359/588 |
| 2014/0071428 A1 | 3/2014 | Suzuki et al. |
| 2017/0299701 A1* | 10/2017 | Ishikawa .............. G02B 26/123 |

FOREIGN PATENT DOCUMENTS

| JP | H05-303049 A | 11/1993 |
| JP | 2004-101686 A | 4/2004 |
| JP | 2012063278 A * | 3/2012 ............. G01S 17/08 |
| JP | 2016-109517 A | 6/2016 |
| WO | WO 2019208306 A1 * | 10/2019 ............. G01S 17/08 |

* cited by examiner

*Primary Examiner* — Mark Hellner
(74) *Attorney, Agent, or Firm* — MASCHOFF BRENNAN

(57) ABSTRACT

A light irradiation apparatus includes an optical window, a light source and an irradiation unit. The optical window is formed of a light-transmissive material. The light source is configured to emit irradiation light with linear polarization. The irradiation unit is configured to irradiate the irradiation light emitted from the light source toward a preset irradiation range through the optical window. Moreover, the optical window has a shape such that the reflectivity of the irradiation light within a specified range is lower than or equal to a preset upper limit; the specified range is provided within the irradiation range.

12 Claims, 12 Drawing Sheets

| | RADIUS OF CURVATURE R [mm] | 4TH-ORDER ASPHERICAL COEFFICIENT A4 | 6TH-ORDER ASPHERICAL COEFFICIENT A6 |
|---|---|---|---|
| OPTICAL WINDOW 1ST SURFACE | −200 | −7.115E−06 | 1.502E−09 |
| OPTICAL WINDOW 2ND SURFACE | −200 | −7.115E−06 | 1.502E−09 |

FIG.9

| DESIGN PARAMETER | VALUE |
|---|---|
| RADIUS OF CURVATURE OF CURVED PART: R | 40mm |
| INSTALLATION ANGLE: $\theta$ | 60deg |
| OFFSET OF INSTALLATION POSITION: $\Delta Y$ | 5mm |
| DISTANCE FROM BEAM POLARIZATION CENTER TO WINDOW SURFACE: L | 11mm |

LIGHT IRRADIATION APPARATUS AND LASER RADAR APPARATUS

CROSS-REFERENCE TO RELATED APPLICATIONS

The present application is a continuation application of International Application No. PCT/JP2019/016157 filed on Apr. 15, 2019, which is based on and claims priority from Japanese Patent Application No. 2018-083075 filed on Apr. 24, 2018. The contents of these applications are hereby incorporated by reference in their entirety into the present application.

BACKGROUND

1 Technical Field

The present disclosure relates to techniques for suppressing light reflection from an optical window through which irradiated light is transmitted.

2. Description of Related Art

In a laser radar apparatus, a light beam emitted from a light source is irradiated, using polarizing means such as a rotating polarizing mirror, within an irradiation range of a preset wide angle. The laser radar apparatus is received in a housing, and the light beam is irradiated outside the housing through an optical window.

The light beam is irradiated from a single point and incident on different parts of the optical window at different angles. The reflectivity of the optical window varies depending on the angle of incidence of the light. Therefore, the reflectivity and thus the sensitivity of detecting the reflected light at a light-receiving unit vary depending on the azimuth within the irradiation range. Moreover, the reflected light is received as noise by the light-receiving unit and the amount thereof varies depending on the irradiation direction of the light beam. Therefore, it is difficult to uniformly cancel the reflected light. In particular, a light-receiving element employed in the laser radar apparatus has high sensitivity; therefore the influence of such reflected light is large.

SUMMARY

According to one aspect of the present disclosure, there is provided a light irradiation apparatus which includes an optical window, a light source and an irradiation unit. The optical window is formed of a light-transmissive material. The light source is configured to emit irradiation light with linear polarization. The irradiation unit is configured to irradiate the irradiation light emitted from the light source toward a preset irradiation range through the optical window. Moreover, the optical window has a shape such that the reflectivity of the irradiation light within a specified range is lower than or equal to a preset upper limit; the specified range is provided within the irradiation range.

According to another aspect of the present disclosure, there is provided a laser radar apparatus which includes a light irradiation apparatus, a light receiving unit and a computing unit. The light irradiation apparatus is the above-described light irradiation apparatus according to the one aspect of the present disclosure. The light receiving unit is configured to receive reflected light; the reflected light is the light emitted from the light irradiation apparatus and reflected by an object. The computing unit is configured to calculate a distance to the object based on both a light-emitting timing at the light irradiation apparatus and a light-receiving timing at the light receiving unit.

BRIEF DESCRIPTION OF THE DRAWINGS

FIG. 9 is a table showing the parameters defining the shape of the optical window of a second example.

DESCRIPTION OF EMBODIMENTS

In Japanese Patent Application Publication No. JP 2011-112632 A, there is disclosed a technique of providing a wave plate in a path from the light source to the optical window and adjusting, by rotating the wave plate according to the irradiation direction, the polarization of the light beam and thereby suppressing variation in the sensitivity due to the azimuth. That is, this technique utilizes the phenomenon that the relationship between the angle of incidence of the light and the reflectivity changes depending on the polarization direction of the light incident on the optical window.

However, the inventors of the present application have found, through detailed investigation, that according to the technique disclosed in the above patent document, it is necessary to rotate the wave plate, thus complicating the configuration of the laser radar apparatus.

In contrast, with the configuration of the above-described light irradiation apparatus according to the present disclosure, it is possible to suppress the reflectivity of the irradiation light within the specified range without newly employing a mechanical drive unit or the like.

Hereinafter, embodiments of the present disclosure will be described with reference to the drawings.

1. First Embodiment

[1-1. Configuration]

Figure 1:
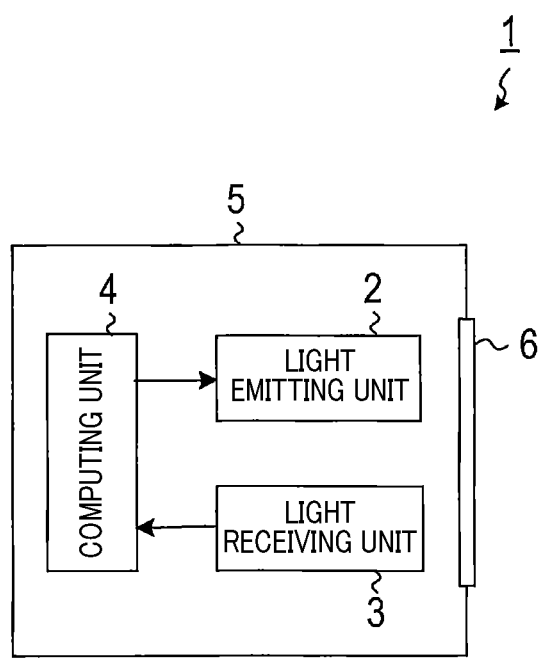
FIG. 1 is a block diagram illustrating the overall configuration of a laser radar apparatus.

A laser radar apparatus 1 shown in FIG. 1 includes a light emitting unit 2, a light receiving unit 3, a computing unit 4, a housing 5 and an optical window 6. In addition, the light emitting unit 2 and the optical window 6 together correspond to a light irradiation apparatus.

The housing 5 is a box having an opening through which light transmits. In the housing 5, there are received the light emitting unit 2, the light receiving unit 3 and the computing unit 4.

The optical window 6 is formed of a light-transmissive material. The optical window 6 is provided so as to close the opening of the housing 5.

Figure 2:
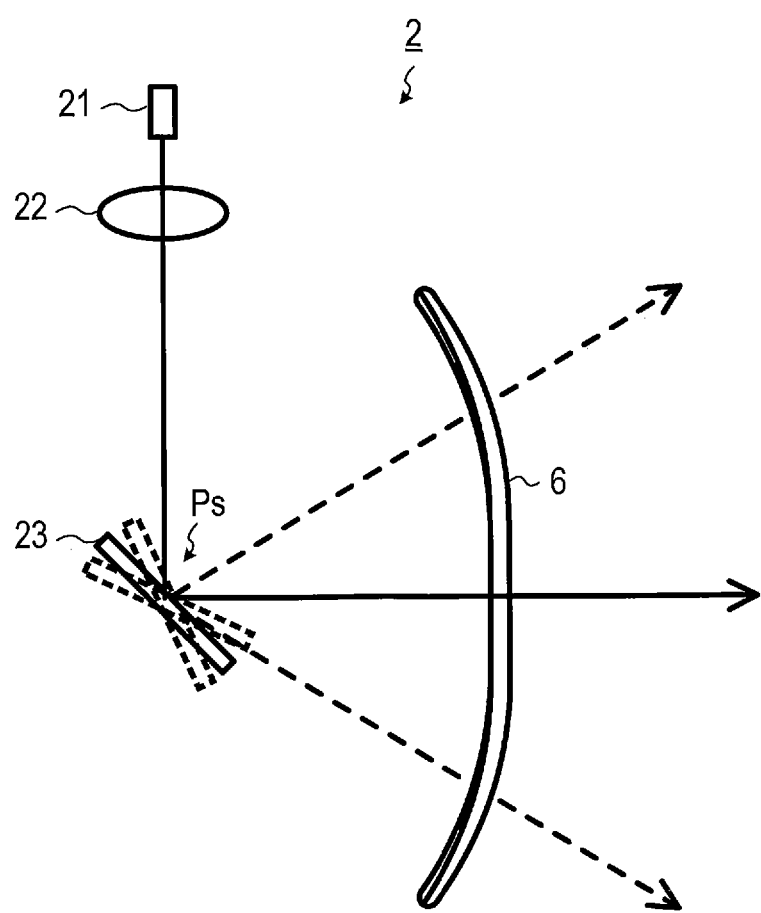
FIG. 2 is an explanatory diagram illustrating the configuration and operation of a light emitting unit and an optical window in a first embodiment.

The light emitting unit 2 irradiates a light beam toward a preset irradiation range through the optical window 6. As shown in FIG. 2, the light emitting unit 2 includes a light source 21, a lens 22 and a polarizing unit 23.

The light source 21 is a laser that emits linearly-polarized light. More particularly, in the present embodiment, a semiconductor laser having a rectangular light-emitting surface is employed. The light irradiated from an ordinary semiconductor laser has a linear polarization in a direction parallel to the longitudinal direction of the light emitting surface. The arrangement of a semiconductor laser depends on the optical design thereof. In the present disclosure including FIG. 2, the semiconductor laser is set to have a linear polarization in a direction perpendicular to the plane of the paper.

The lens 22 collimates the light beam emitted from the light source 21 into a parallel state; the collimated light is then incident on the polarizing unit 23. In addition, the light beam outputted from the lens 22 is not necessarily collimated accurately; it may be diffused light or converged light provided that a beam width is obtainable with which it is possible to secure necessary detection accuracy at a maximum detection distance required for the laser radar apparatus 1. That is, the lens 22 is an optical element that alters the beam shape of the light beam emitted from the light source 21 so as to have the light beam irradiated to part of the irradiation range.

The light polarizing unit 23 includes a polarizing mirror that reflects the light beam, and a drive unit that drives rotation of the polarizing mirror. Hereinafter, the point on the polarizing mirror at which the light beam incident from the light source 21 via the lens 22 is reflected will be referred to as the reflection point Ps. With the irradiation range being a preset angular range on a plane perpendicular to the rotating shaft of the polarizing mirror, the light beam reflected by the polarizing mirror is emitted while scanning the irradiation range. The irradiation range is set to, for example, a range of ±60° with the central direction of the irradiation range set to 0°. That is, the light polarizing unit 23 changes the emission direction of the light beam. In addition, the lens 22 and the polarizing unit 23 together correspond to an irradiation unit.

The light receiving unit 3 receives reflected light; the reflected light is the light emitted by the light emitting unit 2 and reflected by an object present within the irradiation range. Though not shown in the figures, the light receiving unit 3 shares both the optical window 6 and the polarizing unit 23 with the light emitting unit 2. Moreover, the light receiving unit 3 includes a lens that converges the reflected light incident from the polarizing unit 23, and a light receiving element that receives the converged reflected light. It should be noted that the light receiving unit 3 may alternatively include an optical window 6 and a polarizing unit 23 different from those of the light emitting unit 2. Moreover, as another alternative, the polarizing unit may be omitted from the light receiving unit 3.

The computing unit 4 measures the length of time from the light-emitting timing at the light emitting unit 2 to the light-receiving timing at the light receiving unit 3 and thereby calculates the distance to the object that has reflected the light. Moreover, the computing unit 4 detects, based on the rotation angle of the polarizing mirror at the light-receiving timing, the direction in which the object having reflected the light exists.

The optical window 6 has both a first surface facing the internal space of the housing 5 and a second surface facing the external space of the housing 5. Each of the first and second surfaces of the optical window 6 has an aspherical shape such that the reflectivity of S-polarized light is lower than or equal to 5% over the entire range where the light emitted to the irradiation range is incident on the surface. S-polarized light is light whose plane of polarization is parallel to the incidence surface. P-polarized light is light whose plane of polarization is perpendicular to the incidence surface. Here, the incidence surface is the first surface or the second surface of the optical window 6.

Figure 3:
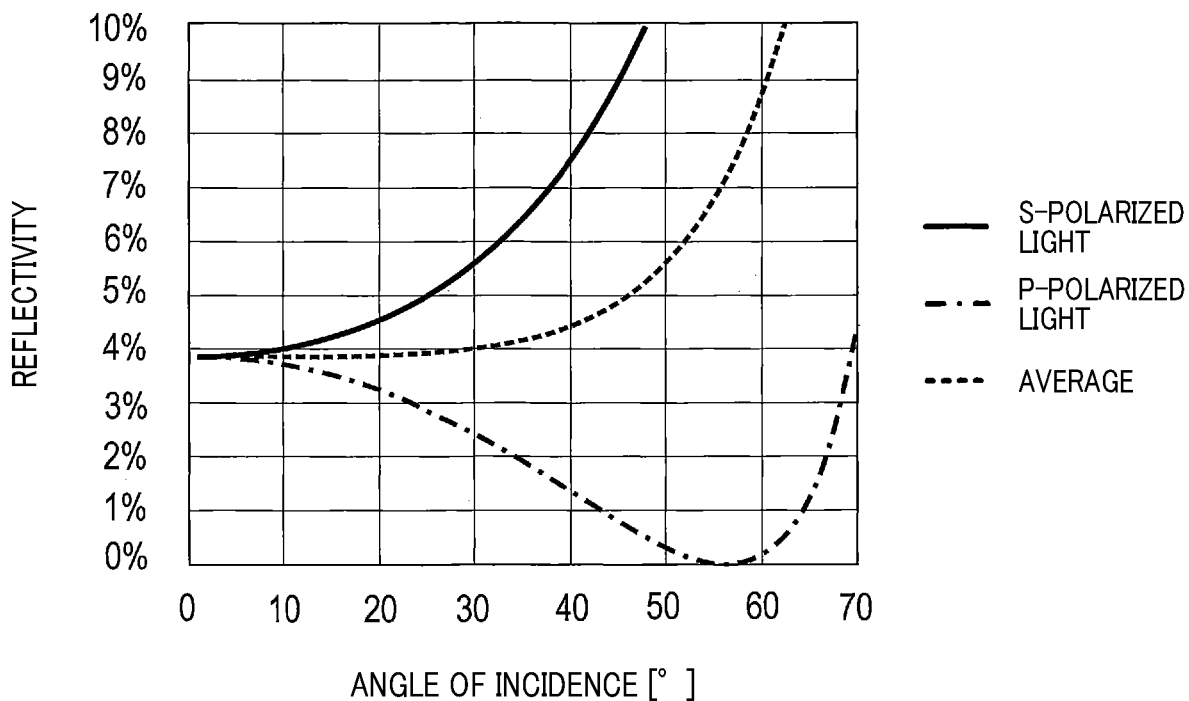
FIG. 3 is a graph illustrating the relationship between the angle of incidence of light to the optical window and the reflectivity.

As shown in FIG. 3, the reflectivity of S-polarized light increases with the angle of incidence to the optical window 6. To have the reflectivity of S-polarized light lower than or equal to 5%, it is necessary to set the angle of incidence to be lower than or equal to 25°. FIG. 3 illustrates the paths of the light beam incident on the optical window 6 from the reflection point Ps of the light beam on the polarizing mirror.

Figures 4, 5:
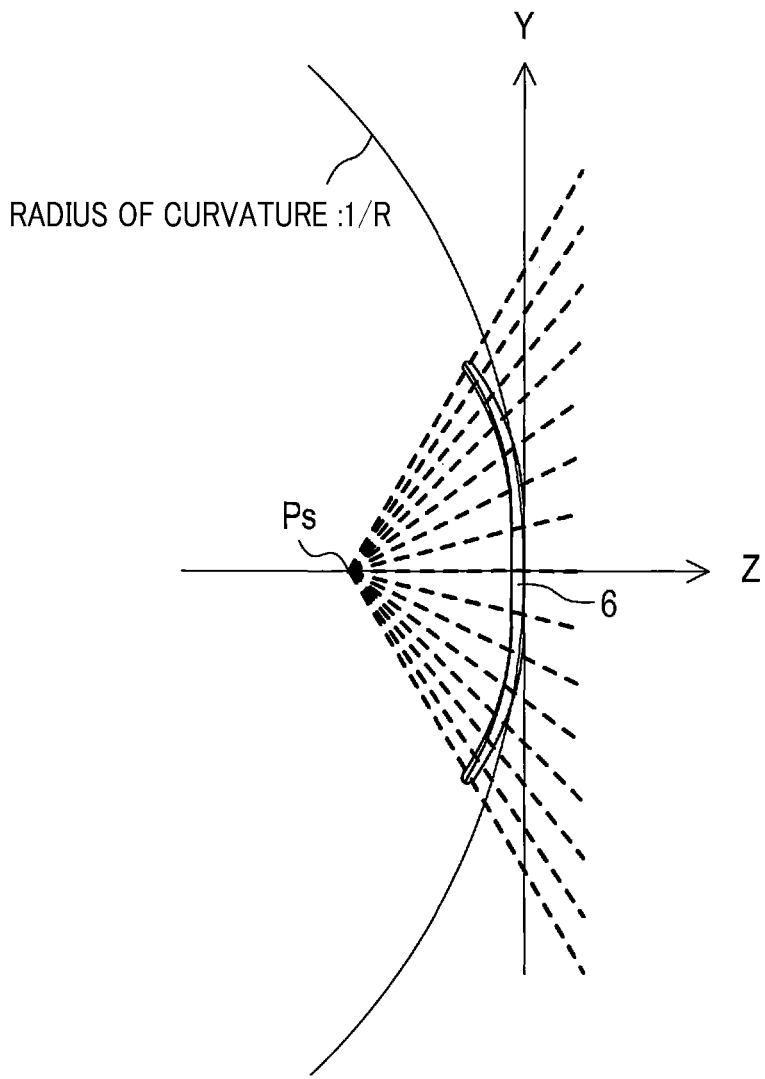
FIG. 4 is an explanatory diagram illustrating parameters defining the shape of the optical window applied to the first embodiment.
FIG. 5 is a table showing the parameters defining the shape of the optical window of a first example.

The aspherical shape of the optical window 6 is set using the following Equation (1). Moreover, as shown in FIG. 4, a coordinate system is used where: a Z axis represents the central direction of the irradiation range on a plane perpendicular to the rotating shaft of the polarizing mirror; a Y axis is perpendicular to the Z axis on the plane and tangent to the second surface of the optical window 6; and an X axis is perpendicular to both the Z axis and the Y axis. In the following Equation (1), Ai is the ith-order aspherical coefficient, R is the radius of curvature and k is the conic constant. The above-described reflectivity is realized by suitably changing at least one of Ai and R.

[Equation 1]

$$Z(y) = \frac{y^2/R}{1 + \sqrt{1-(1+k)y^2/R^2}} + \sum Ai y^i \quad (1)$$

Moreover, the optical window 6 is formed of polymethyl methacrylate (hereinafter, PMMA) whose refractive index n is equal to 1.49; the optical window 6 has a thickness of 2 mm. The optical window 6 is designed under the constraint that the distance L from the reflection point Ps to the first surface of the optical window 6 is equal to 25 mm. Moreover, to prevent the arrangement of a plurality of optical components of the light emitting unit 2 and the optical paths between the optical components from being constrained by the shape of the optical window 6, the radius of curvature of the optical window 6 is set to a sufficiently large value so as to make the shape of the optical window 6 as close to a flat shape as possible. FIG. 5 shows an example (hereinafter, the first example) of the parameters for making the reflectivity at the optical window 6 lower than or equal to 5%. In addition, in this example, both the first and second surfaces of the optical window 6 have the same shape.

Figure 6:
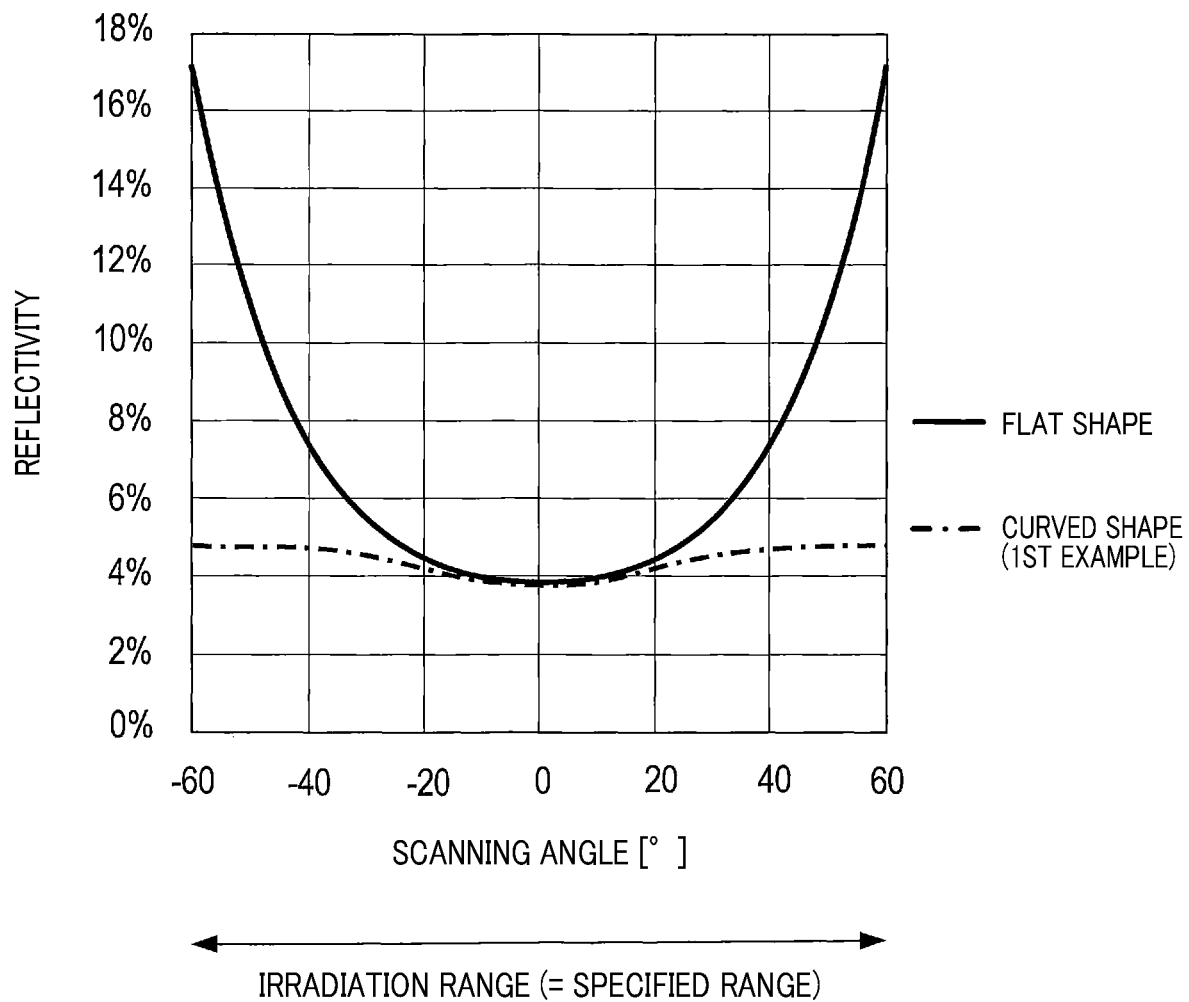
FIG. 6 is a graph illustrating both the reflection properties of the optical window of the first example and the reflection properties of a flat optical window according to the prior art.

FIG. 6 is a graph illustrating the relationship between the scanning angle (−60°)-(60°) within the irradiation range viewed from the reflection point Ps and the reflectivity of S-polarized light at the optical window 6 in the first example; the relationship is determined by a simulation. For comparison, in FIG. 6, there is also shown the reflectivity at a flat optical window. From the graph, it can be seen that the reflectivity in the first example is made to be lower than or equal to 5% over the entire irradiation range. That is, in this case, the entire irradiation range corresponds to a specified range and 5% corresponds to an upper limit of the reflectivity.

[1-2. Advantageous Effects]

According to the above-described first embodiment, it is possible to achieve the following advantageous effects.

(1a) In the present embodiment, the shape of the optical window 6 and the relative position between the optical window 6 and the reflection point Ps are set so as to have the angle of incidence of the light beam incident from the reflection point Ps onto the optical window 6 be within a specific angular range, thereby adjusting the reflectivity at the optical window 6. Consequently, it becomes possible to suppress, with a simple configuration, the reflectivity at the optical window 6 to be lower than or equal to the upper limit without adding any new optical element.

(1b) In the present embodiment, the shape of the optical window 6 is designed on the assumption that the light incident on the optical window 6 is S-polarized light with which the reflectivity becomes worst. Consequently, it becomes possible to suppress, with any linearly-polarized light other than the S-polarized light, the reflectivity at the optical window 6 to be lower than or equal to the upper limit.

2. Second Embodiment

[2-1. Differences from First Embodiment]

The second embodiment has the same basic configuration as the first embodiment. Therefore, only the differences of the second embodiment from the first embodiment will be described hereinafter. In addition, in the second embodiment, the same reference signs as in the first embodiment designate the same configurations as in the first embodiment; therefore, reference can be made to the preceding explanation.

In the above-described first embodiment, the optical window is formed to have the aspherical shape represented by a single equation; the polarization of the light beam incident on the optical window is not particularly limited. In contrast, the second embodiment differs from the first embodiment in that: the light beam to be incident on an optical window 6a is adjusted to become P-polarized light in a light emitting unit 2a; and the shape of the optical window 6a is different from the shape of the optical window 6 in the first embodiment.

Figure 7:
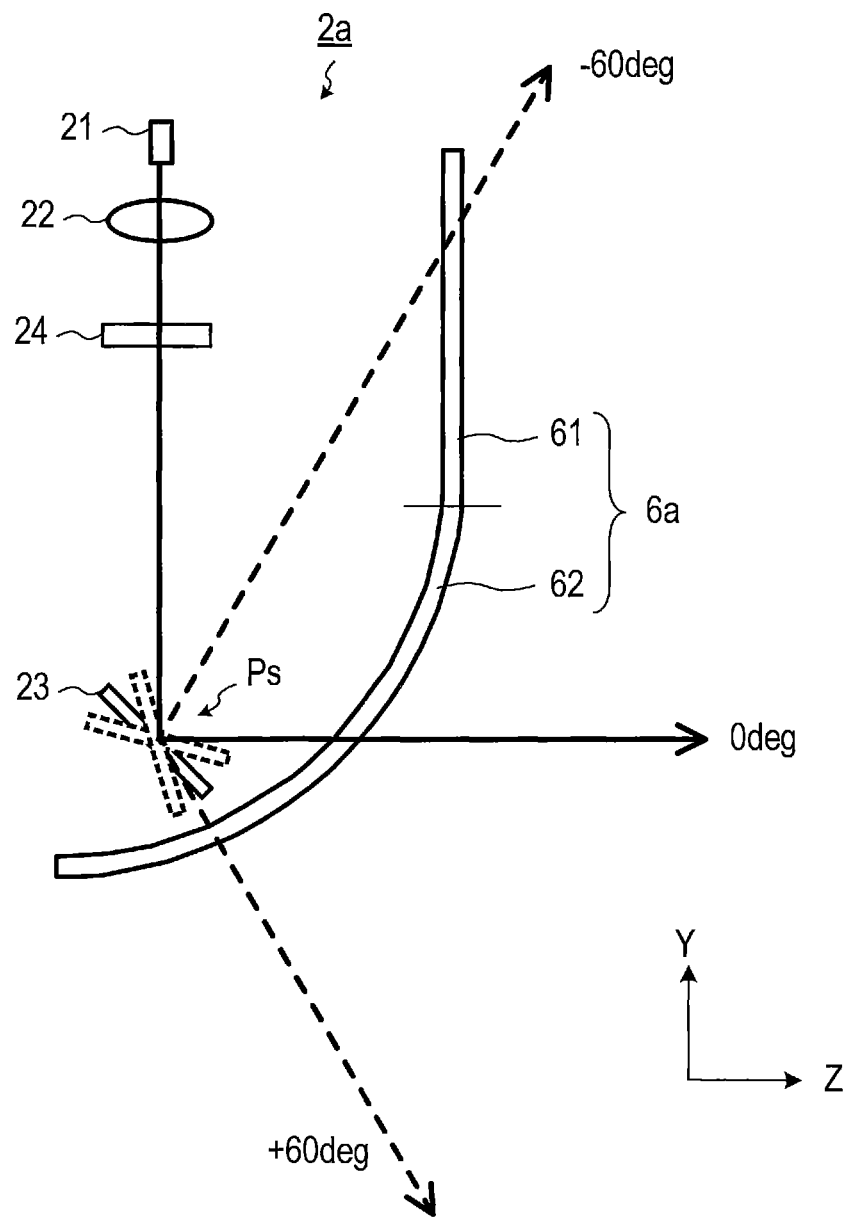
FIG. 7 is an explanatory diagram illustrating the configuration and operation of a light emitting unit and an optical window in a second embodiment.

As shown in FIG. 7, the light emitting unit 2a includes a polarization adjustment unit 24 in addition to the light source 21, the lens 22 and the polarizing unit 23.

The polarization adjustment unit 24 includes a quarter-wave plate arranged in an optical path between the lens 22 and the polarizing unit 23. The polarization adjustment unit 24 is installed so as to adjust the light beam to be incident on the optical window 6a to become P-polarized light. It should be noted that the polarization adjustment unit 24 may alternatively be arranged in an optical path between the light source 21 and the lens 22. In the case of the light source 21 being implemented by a semiconductor laser, with the polarization adjustment unit 24 arranged closer to the light source 21, it is possible to reduce the diameter of the light beam and thus the size of the polarization adjustment unit 24. Moreover, in the case of the lens 22 being implemented by a converging lens, the polarization adjustment unit 24 may be arranged in the vicinity of the convergent point. With the polarization adjustment unit 24 arranged at a position where the diameter of the light beam is small, it is possible to reduce the size of the polarization adjustment unit 24.

The optical window 6a has a flat part 61 and a curved part 62.

A cross section of the curved part 62 along a plane (i.e., Y-Z plane) perpendicular to the rotating shaft of the polarizing mirror has the shape of an arc defined by a radius of curvature. That is, the curved part 62 is a curved plate-shaped part. The flat part 61 is a flat plate-shaped part that is connected with one end of the curved part 62 and have both a first surface and a second surface arranged along the Y axis. The optical window 6a is designed so that the reflectivity is lower than or equal to 2% when the scanning angle is within the range of (−20°)-(20°) (hereinafter, the specified range) and lower than or equal to 4% when the scanning angle is outside the specified range.

Figure 8:
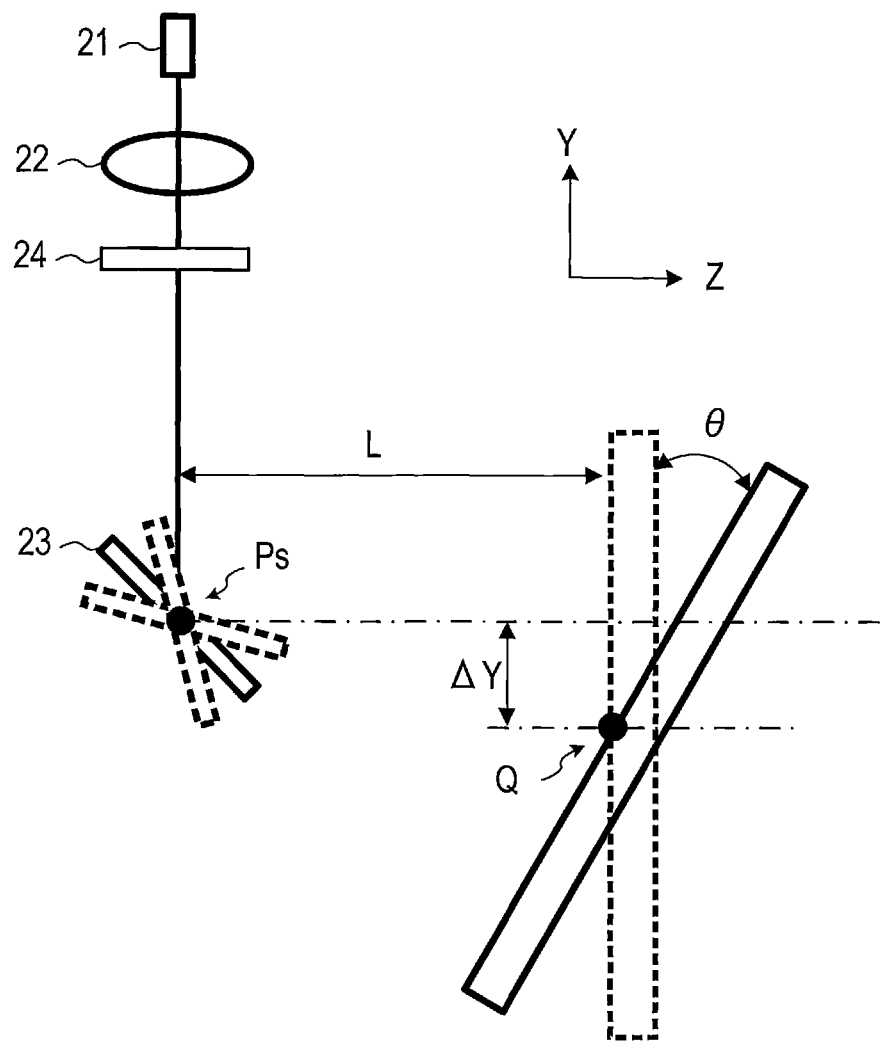
FIG. 8 is an explanatory diagram illustrating parameters defining the shape of the optical window applied to the second embodiment.

Specifically, as shown in FIG. 8, a point which is located away from the reflection point Ps by L in the Z direction and offset from the reflection point Ps by ΔY in the Y direction is defined as an offset point Q. Moreover, the radius of curvature R of the curved part 62 and the position (L, ΔY) of the offset point Q are set so as to have the first surface of the curved part 62 located at the offset point Q and the tangential direction of the first surface of the optical window 6a at the offset point Q coincident with an installation angle θ. In addition, the installation angle θ is set to be in the vicinity of the Brewster's angle for the reflection properties of P-polarized light. More particularly, the installation angle θ is set to, for example, 60°. Moreover, the position of the offset point Q is set so that the direction of the offset point Q viewed from the reflection point Ps is within the specified range.

FIG. 9 shows an example (hereinafter, the second example) of the parameters for making the reflectivity at the optical window 6a lower than or equal to 4%, more particularly lower than or equal to 2% within the specified range. It should be noted that the parameters shown in FIG. 9 are parameters defining the shape of the first surface.

Figure 10:
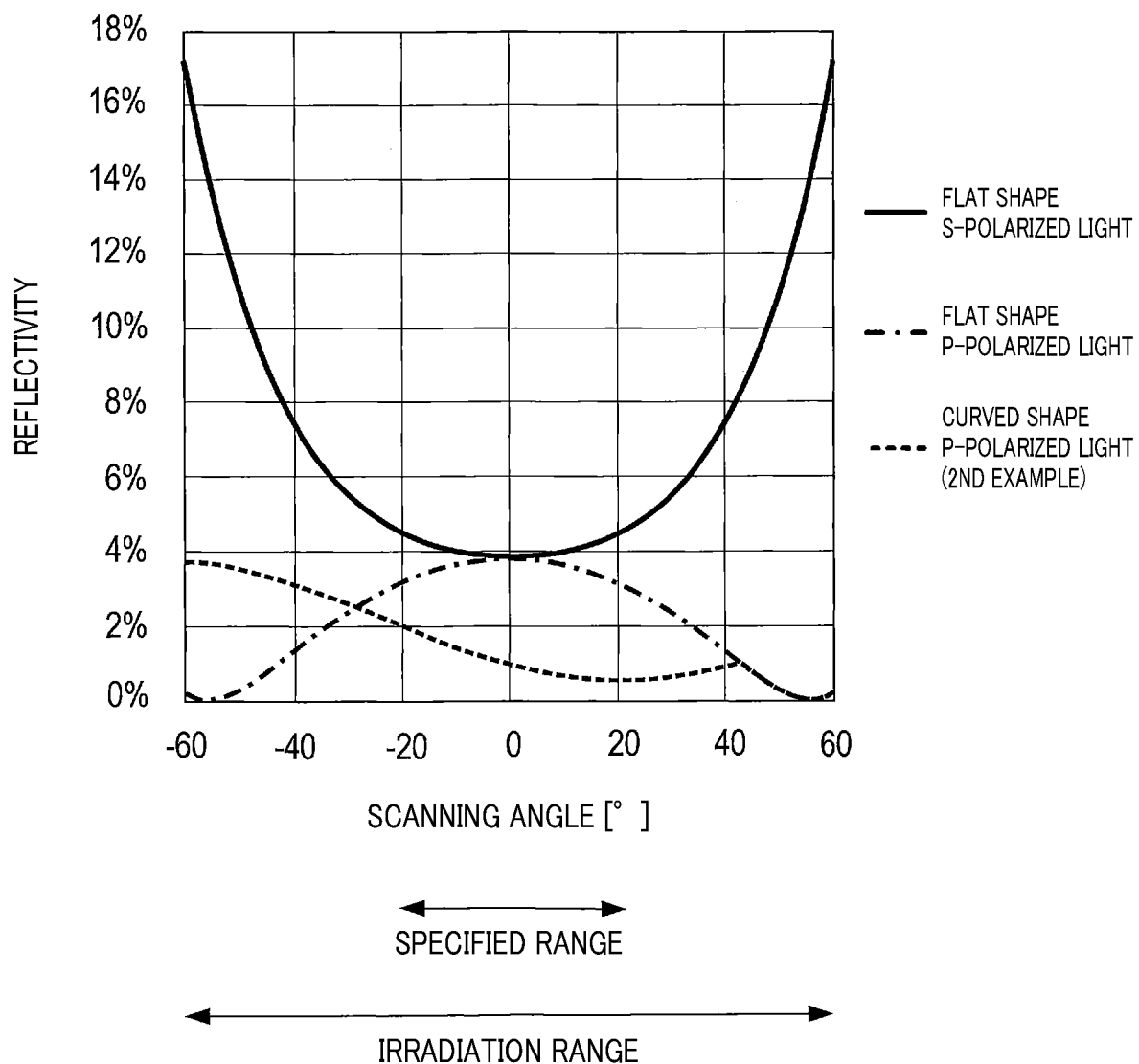
FIG. 10 is a graph illustrating both the reflection properties of the optical window of the second example and the reflection properties of the flat optical window according to the prior art.

FIG. 10 is a graph illustrating the relationship between the scanning angle (−60°)-(60°) within the irradiation range viewed from the reflection point Ps and the reflectivity of P-polarized light at the optical window 6a in the second example; the relationship is determined by a simulation. For comparison, in FIG. 10, there are also shown both the reflectivity of S-polarized light and the reflectivity of P-polarized light in the case of a flat optical window. In addition, in the case of the second example, the light beam is incident on the curved part 62 with the scanning angle being in a range from (−60°) to the vicinity of 40°, and incident on the flat part 61 with the scanning angle being in a range from the vicinity of 40° to 60°.

As can be seen from the graph of FIG. 10, in the case of the flat optical window, the reflectivity of P-polarized light becomes highest at the scanning angle of 0°. In contrast, the reflection properties in the second example are obtained by shifting the reflectivity of P-polarized light by the effect of the curved part 62. Consequently, by shifting the properties in the vicinity of the Brewster's angle, where the reflectivity is low, to the position of the specified range, it becomes possible to realize the desired properties.

[2-2. Advantageous Effects]

According to the above-described second embodiment, it is possible to achieve the following advantageous effects as well as the advantageous effect (1a) of the above-described first embodiment.

(2a) In the present embodiment, the polarization adjustment unit 24 is added to the light emitting unit 2a and the light beam to be incident on the optical window 6a is adjusted to become P-polarized light. Consequently, it becomes possible to further suppress the reflectivity at the optical window 6a in comparison with the case where S-polarized light is incident on the optical window 6a.

(2b) In the present embodiment, it is possible to adjust, by suitably adjusting both the position of the offset point Q and the radius of curvature R of the curved part 62, the range of the scanning angle where the low reflectivity in the vicinity of the Brewster's angle can be obtained. As a result, it becomes possible to realize various reflection properties according to the environment where the laser radar apparatus 1 is used.

(2c) In the present embodiment, though the polarization adjustment unit 24 is added to the light emitting unit 2a, it is unnecessary to mechanically drive the polarization adjustment unit 24. Consequently, it becomes possible to realize the desired properties with a simpler configuration than the prior art.

3. Other Embodiments

As above, the first and second embodiments of the present disclosure have been described. However, the present disclosure is not limited to the above-described first and second embodiments and can be implemented through various modifications.

Figure 11:
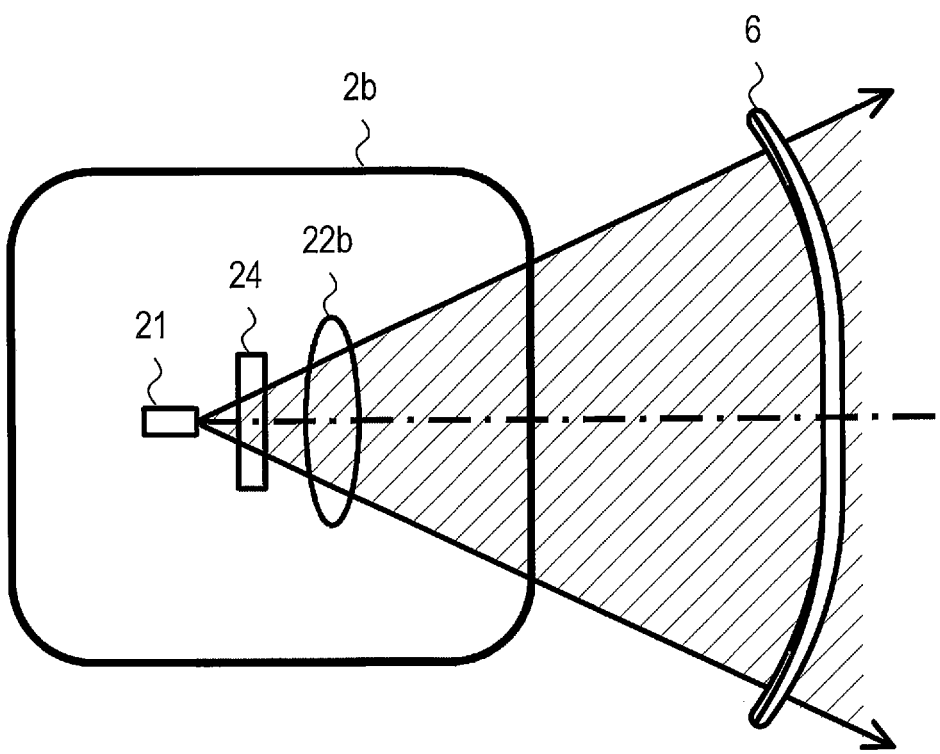
FIG. 11 is an explanatory diagram illustrating the configuration of a light emitting unit in another embodiment.

(3a) In the above-described first and second embodiments, the light emitting unit 2 or 2a is configured to scan the irradiation range with the light beam using the polarizing unit 23. In contrast, as shown in FIG. 11, an alternative light emitting unit 2b may be configured to irradiate the light beam to all the irradiation range at once. In this case, the light emitting unit 2b is configured with the light source 21, the polarization adjustment unit 24 and a lens 22b. The lens 22b converts the light beam, which is incident from the light source 21 via the polarization adjustment unit 24, into diffused light whose beam diameter expands; then the diffused light is directly incident on the optical window 6. In addition, the polarization adjustment unit 24 may be omitted from the configuration of the light emitting unit 2b.

Figure 12:
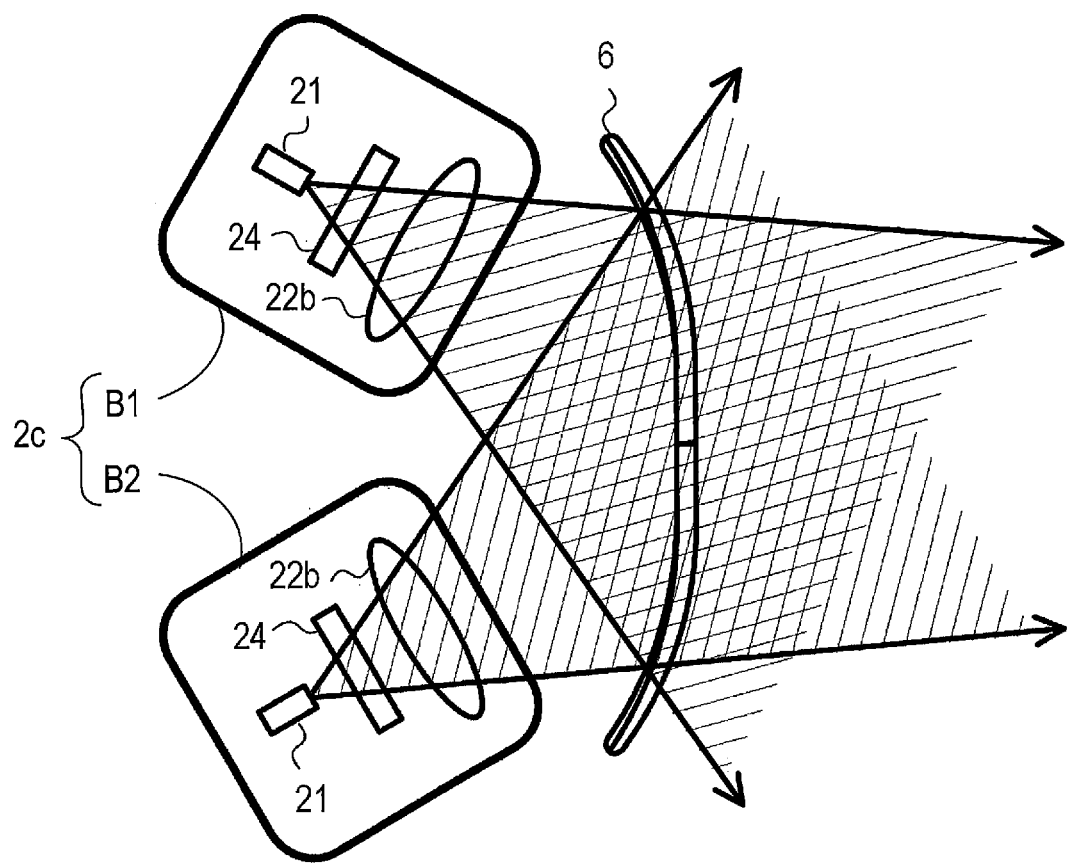
FIG. 12 is an explanatory diagram illustrating the configuration of a light emitting unit in yet another embodiment.

Moreover, in FIG. 11, the light emitting unit 2b is configured to irradiate, with the single light source 21, the light beam to all the irradiation range at once. Alternatively, a plurality of light sources 21 may be employed. For example, as shown in FIG. 12, another alternative light emitting unit 2c may include two light emitting blocks B1 and B2 each having the same configuration as the light emitting unit 2b shown in FIG. 11. In this case, the arrangement of each of the light emitting blocks B1 and B2 and the shape of each of the lenses 22b of the light emitting blocks B1 and B2 are set so that the entire irradiation range is covered by the irradiation lights irradiated respectively from the light emitting blocks B1 and B2. Furthermore, though not shown in the figures, besides the above-described embodiments, polarizing means such as the above-described polarizing unit 23 may be provided behind each of the lens 22b so as to have the entire irradiation range covered by the irradiation lights irradiated respectively from the light emitting blocks B1 and B2. In addition, the polarization adjustment unit 24 may be omitted from the configuration of each of the light emitting blocks B1 and B2 of the light emitting unit 2c.

(3b) In the above-described second embodiment, the half-wave plate is employed as the polarization adjustment unit 24. However, the present disclosure is not limited to the above. For example, a liquid crystal optical element may alternatively be employed as the polarization adjustment unit 24.

(3c) In the above-described first and second embodiments, explanation is given of the case of performing one-dimensional scanning. As an alternative, it is possible to perform scanning also along the X-axis direction perpendicular to the Y-Z plane. In this case, the cross-sectional shape of the optical window 6 on the X-Z plane may be designed to be a curved shape. Otherwise, in the case of the cross-sectional shape on the X-Z plane being a flat shape, it is possible to arrange a quarter-wave plate in a path of the light beam and rotate the quarter-wave plate according to change in the irradiation direction of the light beam along the X-axis direction, thereby adjusting the reflectivity at the optical window 6 to be substantially constant regardless of the position in the X-axis direction.

Figure 13:
FIG. 13 is an explanatory diagram showing the shape of an optical window in another embodiment.

(3d) In the above-described first and second embodiments, both the first and second surfaces of the optical window 6 or 6a have the same shape. However, the present disclosure is not limited to the above. For example, as shown in FIG. 13, an alternative optical window 6b may have its second surface, which pertains to the external appearance of the apparatus, formed as a flat surface and its first surface formed as a curved surface. As another alternative, the first and second surfaces may be formed respectively as two curved surfaces having different shapes.

(3e) A plurality of functions realized by a single component in the above-described embodiments may alternatively be realized respectively by a plurality of components. Moreover, a single function realized by a single component in the above-described embodiments may alternatively be realized by a plurality of components together. In contrast, a plurality of functions realized respectively by a plurality of components in the above-described embodiments may alternatively be realized by a single component. Moreover, a single function realized by a plurality of components together in the above-described embodiments may alternatively be realized by a single component. Furthermore, part of the configuration of each of the above-described embodiments may be omitted. In addition, the configuration of each of the above-described embodiments may be partially added to or partially replaced with the configuration of another of the above-described embodiments.

(3f) In addition to the above-described light irradiation apparatus, the present disclosure may also be embodied in various modes such as a system, which includes the light irradiation apparatus as a component thereof, and a method of designing an optical window.

What is claimed is:
1. A light irradiation apparatus comprising:
   an optical window formed of a light-transmissive material;
   a light source configured to emit irradiation light with linear polarization; and
   an irradiation unit configured to irradiate the irradiation light emitted from the light source toward a preset irradiation range through the optical window, wherein
the optical window has a shape such that a reflectivity of the irradiation light within a specified range is lower than or equal to a preset upper limit, the specified range being provided within the irradiation range, and
the light irradiation apparatus further comprises a polarization adjustment unit configured to change polarization of the irradiation light emitted from the light source so as to make the irradiation light, which is to be incident from the irradiation unit onto the optical window, become P-polarized light,
wherein the polarization adjustment unit is arranged between the light source and the irradiation unit.

2. The light irradiation apparatus as set forth in claim 1, wherein the optical window has both a first surface on which the irradiation light from the irradiation unit is incident and a second surface from which the irradiation light is emitted out of the optical window, and
either of the first and second surfaces of the optical window has a curved shape.

3. The light irradiation apparatus as set forth in claim 1, wherein the optical window has a flat part and a curved part, the flat part being a flat plate-shaped part, the curved part being a curved plate-shaped part.

4. The light irradiation apparatus as set forth in claim 1, wherein the irradiation unit comprises:
an optical element configured to alter a beam shape of the irradiation light so as to have the irradiation light irradiated to part of the irradiation range; and
a polarizing unit configured to change an emission direction of a light beam within the irradiation range, the light beam being the irradiation light whose beam shape has been altered by the optical element.

5. A light irradiation apparatus comprising:
an optical window formed of a light-transmissive material;
a light source configured to emit irradiation light with linear polarization; and
an irradiation unit configured to irradiate the irradiation light emitted from the light source toward a preset irradiation range through the optical window,
wherein
the optical window has a shape such that a reflectivity of the irradiation light within a specified range is lower than or equal to a preset upper limit, the specified range being provided within the irradiation range, and
the irradiation unit comprises an optical element configured to alter a beam shape of the irradiation light so as to have the irradiation light irradiated to all the irradiation range at once.

6. The light irradiation apparatus as set forth in claim 5, wherein the light irradiation apparatus comprises a plurality of light sources,
the irradiation unit comprises a plurality of optical elements respectively corresponding to the plurality of light sources, and
the plurality of optical elements are configured to respectively alter beam shapes of a plurality of irradiation lights emitted respectively from the plurality of light sources so as to have the entire irradiation range covered by the plurality of irradiation lights.

7. A laser radar apparatus comprising:
a light irradiation apparatus comprising an optical window formed of a light-transmissive material, a light source configured to emit irradiation light with linear polarization, and an irradiation unit configured to irradiate the irradiation light emitted from the light source toward a preset irradiation range through the optical window, wherein the optical window has a shape such that the reflectivity of the irradiation light within a specified range is lower than or equal to a preset upper limit, the specified range being provided within the irradiation range;
a light receiving unit configured to receive reflected light, the reflected light being the light emitted from the light irradiation apparatus and reflected by an object; and
a computing unit configured to calculate a distance to the object based on both a light-emitting timing at the light irradiation apparatus and a light-receiving timing at the light receiving unit, and
the laser radar apparatus further comprises a polarization adjustment unit configured to change polarization of the irradiation light emitted from the light source so as to make the irradiation light, which is to be incident from the irradiation unit onto the optical window, become P-polarized light,
wherein the polarization adjustment unit is arranged between the light source and the irradiation unit.

8. The laser radar apparatus as set forth in claim 7, wherein the optical window has both a first surface on which the irradiation light from the irradiation unit is incident and a second surface from which the irradiation light is emitted out of the optical window, and
either of the first and second surfaces of the optical window has a curved shape.

9. The laser radar apparatus as set forth in claim 7, wherein the optical window has a flat part and a curved part, the flat part being a flat plate-shaped part, the curved part being a curved plate-shaped part.

10. The laser radar apparatus as set forth in claim 7, wherein the irradiation unit comprises:
an optical element configured to alter a beam shape of the irradiation light so as to have the irradiation light irradiated to part of the irradiation range; and
a polarizing unit configured to change an emission direction of a light beam within the irradiation range, the light beam being the irradiation light whose beam shape has been altered by the optical element.

11. A laser radar apparatus comprising:
a light irradiation apparatus comprising an optical window formed of a light-transmissive material, a light source configured to emit irradiation light with linear polarization, and an irradiation unit configured to irradiate the irradiation light emitted from the light source toward a preset irradiation range through the optical window, wherein the optical window has a shape such that the reflectivity of the irradiation light within a specified range is lower than or equal to a preset upper limit, the specified range being provided within the irradiation range;
a light receiving unit configured to receive reflected light, the reflected light being the light emitted from the light irradiation apparatus and reflected by an object; and
a computing unit configured to calculate a distance to the object based on both a light-emitting timing at the light irradiation apparatus and a light-receiving timing at the light receiving unit, wherein
the irradiation unit comprises an optical element configured to alter a beam shape of the irradiation light so as to have the irradiation light irradiated to all the irradiation range at once.

12. The laser radar apparatus as set forth in claim 11, wherein the light irradiation apparatus comprises a plurality of light sources, the irradiation unit comprises a plurality of optical elements respectively corresponding to the plurality of light sources, and the plurality of optical elements are configured to respectively alter beam shapes of a plurality of irradiation lights emitted respectively from the plurality of light sources so as to have the entire irradiation range covered by the plurality of irradiation lights.

* * * * *